(12) United States Patent
Pisut et al.

(10) Patent No.: US 8,804,687 B2
(45) Date of Patent: Aug. 12, 2014

(54) APPARATUS AND METHOD FOR ALLOCATING FREQUENCY RESOURCES IN A FREQUENCY OVERLAY SYSTEM

(75) Inventors: Sanyadechukal Pisut, Suwon-si (KR); Jae-Hee Cho, Seoul (KR); Kwan-Hee Roh, Hwaseong-si (KR); Hee-Kwun Cho, Incheon (KR); Byung-Wook Jun, Seoul (KR); Mingxia Xu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 646 days.

(21) Appl. No.: 12/473,855

(22) Filed: May 28, 2009

(65) Prior Publication Data

US 2009/0296622 A1   Dec. 3, 2009

(30) Foreign Application Priority Data

May 30, 2008   (KR) .................. 10-2008-0051182

(51) Int. Cl.
   *H04B 7/208*   (2006.01)
(52) U.S. Cl.
   USPC ........................................ 370/344
(58) Field of Classification Search
   None
   See application file for complete search history.

(56) References Cited

U.S. PATENT DOCUMENTS

| | | | | |
|---|---|---|---|---|
| 5,737,691 | A * | 4/1998 | Wang et al. | 455/63.3 |
| 6,980,527 | B1 * | 12/2005 | Liu et al. | 370/280 |
| 7,954,032 | B2 * | 5/2011 | Kim et al. | 714/748 |
| 2008/0056387 | A1 * | 3/2008 | Sakar et al. | 375/240.27 |
| 2009/0092066 | A1 * | 4/2009 | Chindapol et al. | 370/277 |
| 2010/0124194 | A1 * | 5/2010 | Chun et al. | 370/329 |

* cited by examiner

*Primary Examiner* — Raj Jain
(74) *Attorney, Agent, or Firm* — Jefferson IP Law, LLP

(57) ABSTRACT

A method for allocating frequency resources by a Base Station (BS) in a frequency overlay system is provided. The method includes grouping at least one Mobile Station (MS) capable of using the same Frequency Allocation (FA), according to zones, multicasting zone information indicating a frequency resource available for each zone to at least one MS belonging to a corresponding zone, unicasting resource allocation information indicating an allocated frequency resource to at least one MS to which the frequency resource is allocated, among the grouped MSs, and communicating with the at least one MS using the allocated frequency resource indicated by the resource allocation information, within the frequency resource indicated by the zone information.

21 Claims, 7 Drawing Sheets

Resource slot from FA1

Resource slot from FA2

Start–Length

Tree–Based

APPARATUS AND METHOD FOR ALLOCATING FREQUENCY RESOURCES IN A FREQUENCY OVERLAY SYSTEM

PRIORITY

This application claims the benefit under 35 U.S.C. §119(a) of a Korean patent application filed in the Korean Intellectual Property Office on May 30, 2008 and assigned Serial No. 10-2008-0051182, the entire disclosure of which is hereby incorporated by reference.

BACKGROUND OF THE INVENTION

1. Field of the Invention

The present invention relates to a frequency overlay system. More particularly, the present invention relates to an apparatus and method for allocating frequency resources in a frequency overlay system.

2. Description of the Related Art

Under the Institute of Electrical and Electronics Engineers (IEEE) 802.16m standard, each Mobile Station (MS) is allocated a frequency resource of 5~20 MHz. Available frequency resources of a Base Station (BS) are divided into a plurality of Frequency Allocations (FAs) which are allocated to MSs serviced by the BS. In an IEEE 802.16m system, a one-dimensional frequency resource allocation technique is used due to its low complexity, low overhead, separate coding MAP message, and high link adaptation gain of each MS's MAP Information Element (IE).

Frequency Overlay (FO) has been devised to support MSs that use various bandwidths. To this end, a frequency resource of a BS is divided into a plurality of FAs, and an MS can access each FA according to availability of the bandwidth. Therefore, an FO system offers a separate coding, one-dimensional resource allocation algorithm that can efficiently operate on multiple FAs.

FIG. 1 illustrates a related FO system having two 10-MHz FAs. FIG. 2A schematically illustrates a related start-length allocation method for resource allocation, and FIG. 2B schematically illustrates a related tree-based allocation method for resource allocation.

As illustrated in FIG. 1, when a BS 140 in an FO system is allocated a frequency resource of 20 MHz, the frequency resource allocated to the BS 140 is divided into two 10-MHz frequency resources. Of the divided frequency resources, the first 10-MHz frequency resource is allocated to an MS_A 110 and the second 10-MHz frequency resource is allocated to an MS_C 130. Herein, the frequency resource allocated to the MS_A 110 is called FA#1, and the frequency resource allocated to the MS_C 130 is called FA#2. An MS_B 120 is allocated both the FA#1 and the FA#2. In this way, an MS can be allocated at least one FA.

The concept of a separate coding MAP message will be described below with reference to FIG. 1. IEs of the MAP message are encoded for each MS individually. Based on the MAP message, a BS adjusts Modulation and Coding Scheme (MCS) level of each MS. When separate coding is used, power for each IE is allocated according to the current channel state of a designated MS instead of an MS having the worst communication state. In the separate coding MAP message, each MAP IE is considered as an individual MAP message, and a Cyclic Redundancy Check (CRC) is added to the end of each MAP IE. Using individual MAP message can cause severe control overhead problem but this may be reduced by removing a Connection Identifier (CID) field for an MS from each MAP IE. In this case, in order to allow each MAP IE to be identified by a specific MS, each MAP IE is individually scrambled such that only an identified MS can decode the MAP IE. When the separate coding MAP message is used, a one-dimensional allocation technique, e.g. start-length and tree-based allocation methods, may be used, in which each MS is not required to detect MAP IEs of other MSs.

FIG. 2A illustrates a start-length allocation method. Frequency resources allocated to each MS are identified by a starting point 202 (206) and a length 204 (208) of a plurality of designated resource slots. FIG. 2B illustrates a tree-based allocation method. In the tree-based allocation method, all resource slots are expressed in a tree structure, and frequency resources allocated for each MS are defined as a tree node in the tree structure.

As illustrated in FIG. 2A, among all frequency resources allocated to a BS, slots 204 of #0 to #4 are allocated to an MS_A and slots 208 of #9 to #14 are allocated to an MS_B, in accordance with the start-length allocation method. In this case, a starting point 202 and a length (=5) 204 are notified to the MS_A, and a starting point 206 and a length (=6) 208 are notified to the MS_B.

As illustrated in FIG. 2B, the tree-based allocation method allocates BS frequency resources to nodes in the tree structure. For example, a node with a node ID=6, which is an upper node of nodes #1 and #2, are used for allocating slots #0 and #1. And the each number of 0, 1, . . . 4 indicates slot index.

In these start-length and tree-based allocation methods, there are two significant problems regarding MAP overhead of the separate coding MAP message. The first problem is a granularity problem. In other words, since each MAP IE is encoded as part of the MAP message, a plurality of 48-bit physical resource blocks are consumed for each MAP IE. In the second problem, because of characteristics of the separate coding, each MS cannot detect useful information from MAP IEs of other MSs.

Due to these two problems, excessive overhead is caused in the FO system. Furthermore, this overhead grows as the number of FAs used for resource allocations are increased. Therefore, there is a need for an improved frequency resource allocation method for a separate coding MAP message in order to reduce the overhead and to address the problem that the MAP overhead increases as the FO system uses additional FAs.

SUMMARY OF THE INVENTION

An aspect of the present invention is to address at least the above-mentioned problems and/or disadvantages and to provide at least the advantages described below. Accordingly, an aspect of the present invention is to provide an apparatus and method for allocating frequency resources in a frequency overlay system.

Another aspect of the present invention is to provide an apparatus and method for allocating a frequency resource for an MS in a frequency overlay system.

Yet another aspect of the present invention is to provide efficient ID allocation with low MAP overhead of a separate coding MAP message in a system supporting frequency overlay.

In accordance with an aspect of the present invention, a method for allocating frequency resources by a Base Station (BS) in a frequency overlay system is provided. The method includes grouping at least one Mobile Station (MS) capable of using the same Frequency Allocation (FA) into a zone, multicasting zone information which indicates a frequency resource available for each zone to at least one MS belonging to a corresponding zone, unicasting resource allocation information which indicates the location of frequency resource allocated to at least one MS, and communicating with the at least one MS using the allocated frequency resource indicated by the resource allocation information, within the frequency resource indicated by the zone information.

In accordance with another aspect of the present invention, an apparatus for allocating frequency resources in a Base Station (BS) for a frequency overlay system is provided. The apparatus includes a device for grouping at least one Mobile Station (MS) capable of using the same Frequency Allocation (FA) into a zone, multicasting zone information indicating a frequency resource available for each zone to at least one MS belonging to a corresponding zone, unicasting resource allocation information indicating an allocated frequency resource to at least one MS to which the frequency resource is allocated, among the grouped MSs, and communicating with the at least one MS using the allocated frequency resource indicated by the resource allocation information, within the frequency resource indicated by the zone information.

In accordance with further another aspect of the present invention, a method for receiving allocated frequency resources by a Mobile Station (MS) in a frequency overlay system is provided. The method includes receiving zone information indicating a frequency resource available for each zone, which is broadcast from a Base Station (BS), receiving resource allocation information indicating an allocated frequency resource, which is unicast to at least one MS to which the frequency resource is allocated, among MSs which are grouped according to zones, and communicating with the BS using the allocated frequency resource indicated by the resource allocation information, within a frequency resource indicated by the zone information. In an exemplary implementation, the MSs are grouped according to zones so that they can use the same Frequency Allocation (FA) in the BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "zone," as used herein, is defined as a set of frequency resources over 1 or more Frequency Allocations (FAs) and MSs in the same zone shall use the same FAs. Each zone includes at least one Frequency Allocation (FA), and one FA may belong to one zone, or two or more zones. Zone information indicating a structure of a frequency set for a zone is multicast to all MSs in the corresponding zone. In the frequency set, frequency resource allocated to each MS is indicated by a resource indicator.

Figure 1:
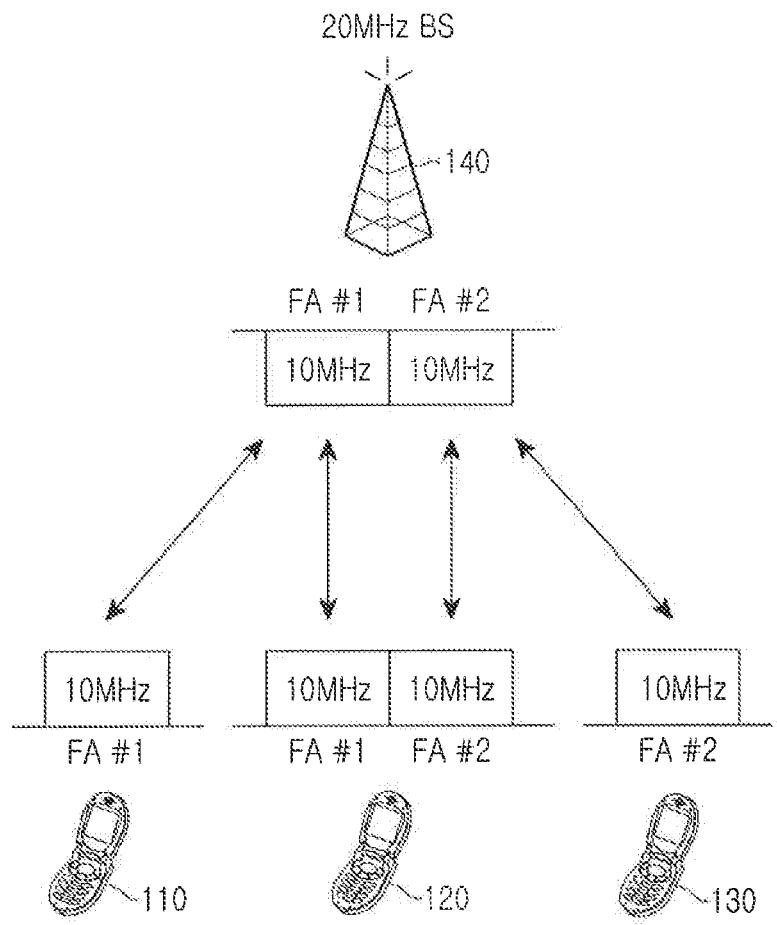
FIG. 1 illustrates a related Frequency Overlay (FO) system having two 10-MHz FAs.
Figure 2A:
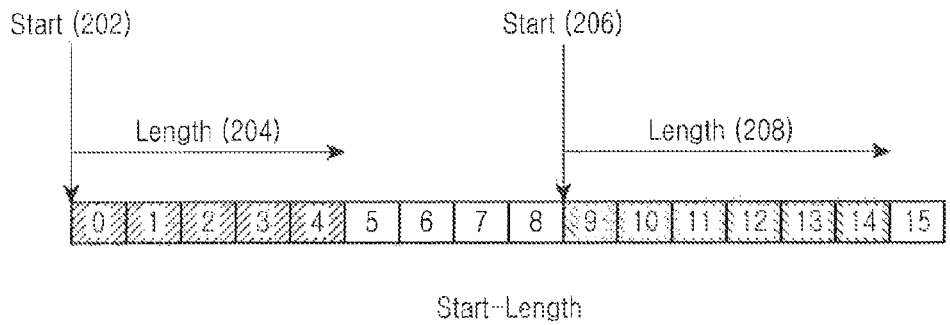
FIG. 2A schematically illustrates a conventional related start-length allocation method for resource allocation.
Figure 2B:
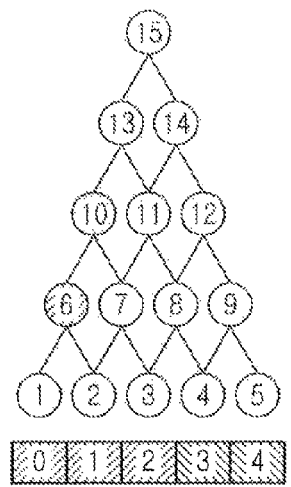
FIG. 2B schematically illustrates a related tree-based allocation method for resource allocation.
Figure 3A:
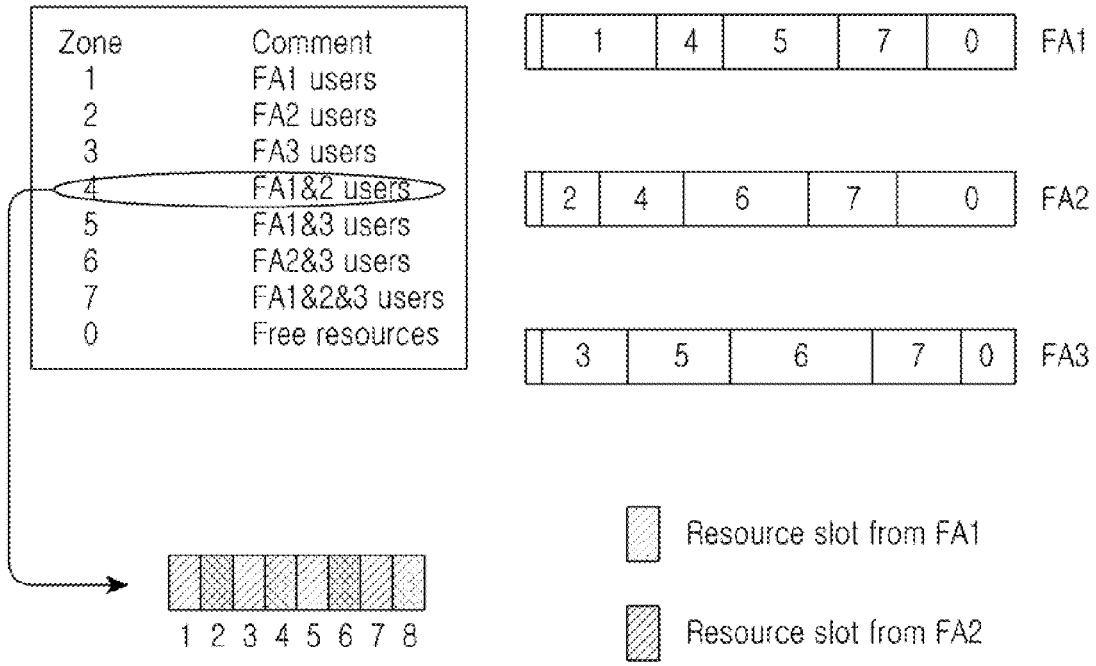
FIG. 3A illustrates zone division for 3 Frequency Allocations (FAs) according to an exemplary embodiment of the present invention.

FIG. 3A illustrates zone division for 3 FAs according to an exemplary embodiment of the present invention.

Referring to FIG. 3A, a zone #1 is assigned to MSs using FA1. A zone #2 and a zone #3 are assigned to MSs using FA2 and FA3, respectively. A zone #4 is assigned to MSs using FA1 and FA2. A zone #5 is assigned to MSs using FA1 and FA3. A zone #6 is assigned to MSs using FA2 and FA3. A zone #7 is assigned to MSs using FA1, FA2 and FA3. In sum, indexes of zones to which MSs using FA1 belong include 1, 4, 5 and 7, indexes of zones to which MSs using FA2 belong include 2, 4, 6 and 7, and indexes of zones to which MSs using FA3 belong include 3, 5, 6 and 7. Each FA is divided into a plurality of resource slots, and each resource slot may be shared by a plurality of zones and a plurality of MSs.

In this manner, each zone includes MSs using the same FA set. That is, the zone #1 includes MSs that use only FA1, and the zone #4 includes MSs that use FA1 and FA2. In addition, resource slots in each zone are arranged in a round-robin manner. That is, a first resource slot allocable in a specific zone denotes a first slot of an FA having the lowest FA index, a second resource slot allocable in the zone denotes a first slot of an FA having the second lowest FA index, and the same goes for other resource slots.

Figure 3B:
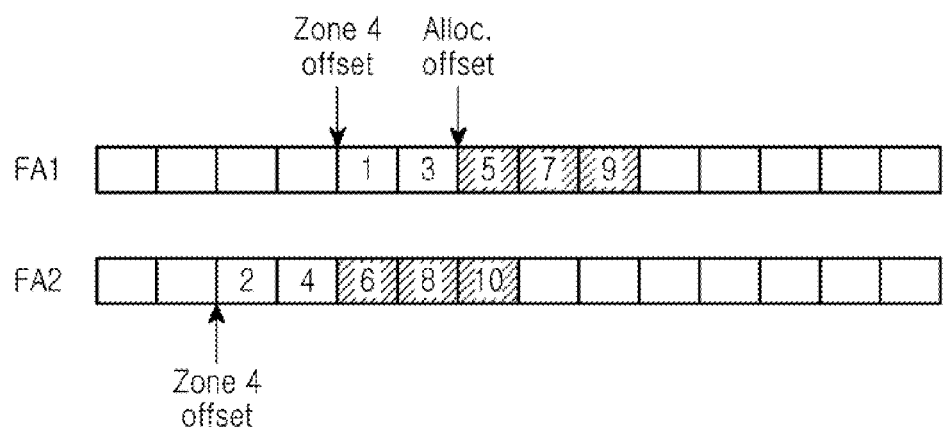
FIG. 3B illustrates a round-robin scheme according to an exemplary embodiment of the present invention.

FIG. 3B illustrates a round-robin scheme according to an exemplary embodiment of the present invention.

Referring to FIG. 3B, when indexes of zones to which MSs using FA1 belong include 1, 4, 5 and 7, the round-robin scheme allocates resource slots to MSs belonging to each zone in a round-robin manner. For example, when there are MSs using FA1 and FA2, the round-robin scheme, as illustrated, alternately allocates frequency resources from FA1 and FA2 to the MSs. That is, it allocates as many frequency resources as the number of allocated slots, to FA1 and FA2.

Zone information indicates information obtained by grouping MSs that use the same frequency set. For efficient transmission of the grouping information, zone information of each zone can be multicast to MSs belonging to the zone. If only one MS belongs to the zone, the zone information is not multicast. However, when at least two MSs belong to the zone, the zone information is multicast. The zone information is an index of a group to which multiple MSs belong, that are grouped into the corresponding zone. The multicasting can be performed by permitting multiple MSs belonging to the same zone to share a scramble key used for receiving the corresponding zone information. A MAP IE's format of zone information in a Frequency Overlay (FO) system with 3 FAs is shown in Table 1.

TABLE 1

| Fields | Bits | Comment |
|---|---|---|
| FA usage bitmap | 3 | For example, [100] means only FA1 is used |
| If (1$^{st}$ MSB of FA usage bitmap==1){Zone's slot offset in FA1} | 7 | The starting point of the zone in FA1 |
| If (2$^{nd}$ MSB of FA usage bitmap==1){Zone's slot offset in FA2} | 7 | The starting point of the zone in FA2 |
| If (3$^{rd}$ MSB of FA usage bitmap==1){Zone's slot offset in FA3} | 7 | The starting point of the zone in FA3 |
| Zone's Length | 9 | Total number of slots in a zone (all FAs) |

As illustrated in Table 1, the format used for the zone information MAP IE includes a 3-bit field indicating an FA usage bitmap, three 7-bit fields indicating each zone's slot offsets in FA1, FA2 and FA3, and a 9-bit zone's length field. The field indicating an FA usage bitmap denotes which FAs are used (e.g. [100] that only FA1 is used), and the fields indicating each zone's slot offsets in FA1, FA2 and FA3 denote starting points of the zone in FA1, FA2 and FA3, respectively. In addition, the zone's length field denotes the total number of slots in all FAs in a specific zone.

The zone information MAP IE is transmitted before resource allocation MAP IEs for MSs in the zone are transmitted. For example, for indication and detection of a regular MAP message, zone information MAP IEs are transmitted through an FA corresponding to the lowest FA index among the FAs associated with the corresponding zone. That is, as illustrated in FIGS. 3A and 3B, zone information MAP IEs of zones #1, #4, #5 and #7 are transmitted through FA1, zone information MAP IEs of zones #2 and #6 are transmitted through FA2, and a zone information MAP IE of a zone #3 is transmitted through FA3. When there are no MSs corresponding to some zones, the corresponding zone information MAP IEs are not transmitted and therefore MAP overhead is reduced.

In a zone division method, a resource allocation MAP IE for each MS may be included in a physical resource block with a maximum size of 48 bits in the start-length and tree-based allocation methods regardless of the number of FAs used. A size of the physical resource block can be changed to optimally apply it to an actual size of the MAP IE, and the tree-based allocation is selected because of the small number of actual bits required to indicate resource allocation. This is advantageous in that when the number of FAs increases, the MAP IE can still be included in 48 bits. Each resource allocation MAP IE can be transmitted as much as zone information MAP IEs.

Table 2 and Table 3 below show exemplary formats used for resource allocation MAP IEs in the tree-based and start-length allocation methods where 3 FAs are used.

TABLE 2

| Fields | Bits | Comment |
|---|---|---|
| DIUC | 4 | |
| Repetition Coding | 2 | |
| Power Boosting | 3 | |
| FA usage bitmap | 3 | Used as zone ID. Shall be the same as its zone. |
| Node ID | ceil (log$_2$(N(N + 1)/2)) | N = Zone's Length (max. Node ID size = 16bits) |
| CRC | 16 | |

TABLE 3

| Fields | Bits | Comment |
|---|---|---|
| DIUC | 4 | |
| Repetition Coding | 2 | |
| Power Boosting | 3 | |
| FA usage bitmap | 3 | Used as zone ID. Shall be the same as its zone. |
| Start Offset | ceil (log$_2$N) | N = Zone's Length (max. Node ID size = 9bits) |
| Length | ceil (log$_2$N) | N = Zone's Length (max. Node ID size = 9bits) |
| CRC | 16 | |

Table 2 shows an exemplary format used for a resource allocation MAP IE in the tree-based allocation method where 3 FA are used. The format includes a 4-bit field indicating a Downlink Interval Usage Code (DIUC), a 2-bit field indicating Repetition Coding, a 3-bit field indicating Power Boosting, a 3-bit field, used as a zone ID, indicating an FA usage bitmap, and a ceil (log 2(N(N+1)/2))-bit field indicating Node ID, where N is a zone's length and an ID's size is 16 bits. In addition, the format includes a 16-bit field indicating CRC. The DIUC includes the number of slots each MS should receive and locations of the slots, and is carried on the MAP through which burst profile information used for transmission is transmitted to the MS.

Table 3 shows an exemplary format used for a resource allocation MAP IE in the start-length allocation method where 3 FAs are used. The format includes a 4-bit field indicating a DIUC, a 2-bit field indicating Repetition Coding, a 3-bit field indicating Power Boosting, a 3-bit field indicating an FA usage bitmap, a ceil (log 2N)-bit field indicating Start Offset, a ceil (log 2N)-bit field indicating Length, and a 16-bit field indicating CRC.

Figure 4:
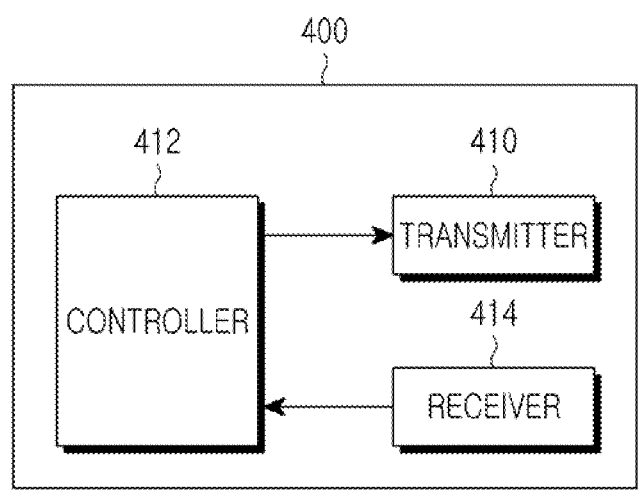
FIG. 4 is a block diagram illustrating a zone-based FO resource allocation apparatus in a BS according to an exemplary embodiment of the present invention.

FIG. 4 is a block diagram illustrating a zone-based FO resource allocation apparatus in a BS according to an exemplary embodiment of the present invention.

Referring to FIG. 4, a zone-based FO resource allocation apparatus 400 in a BS includes a transmitter 410, a controller 412, and a receiver 414. The controller 412 of the BS 400 groups MSs that use the same FA set, according to their zone, and multicasts multicast information for each grouped zone to all MSs in the zone through the transmitter 410. The multicast information includes zone information indicating a zone's starting point in each FA. When a resource is allocated to a specific MS, the controller 412 groups one or more MSs capable of using the same FA, according to their zone, and multicasts zone information indicating a frequency resource available for each grouped zone to one or more MSs belonging to the corresponding zone. In addition, the controller 412 unicasts resource allocation information indicating the allocated frequency resource to at least one MS to which frequency resource is allocated, among the grouped MSs, and exchanges data with the MS using the allocated frequency resource indicated by the resource allocation information, within the frequency resource indicated by the zone information.

The resource allocation information may include only one resource indicator, and be unicast to a specific MS. The resource indicator includes one start offset and one length, and has a zone's starting point and its relative value.

Figure 5:
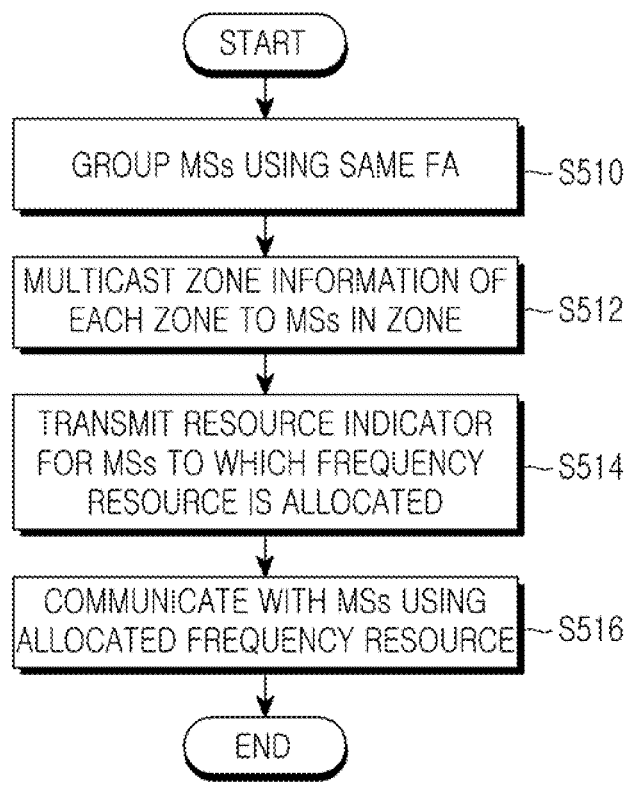
FIG. 5 is a flowchart illustrating a zone-based FO resource allocation method in a BS according to an exemplary embodiment of the present invention.

FIG. 5 is a flowchart illustrating a zone-based FO resource allocation method in a BS according to an exemplary embodiment of the present invention.

Referring to FIG. 5, a BS groups MSs into zones according to FAs allocated the MSs in step S510. MSs classified into a specific zone can use at least one FA. After MSs are classified into zones, the BS multicasts zone information for each zone to the MSs in the corresponding zone in step S512. MSs, which have received the zone information, can determine the zone to which they belong, based on the FA presently allocated to the MSs. After transmitting the zone information, the BS transmits a resource indicator for each of MSs to which frequency resources are allocated, in step S514. The resource indicator indicates a location of a start offset and a slot length in a frequency resource. Each of the MSs detects a location and a length of a slot allocated thereto based on the resource indicator. Thereafter, the BS communicates with the MSs using the allocated frequency resource in step S516.

Figure 6:
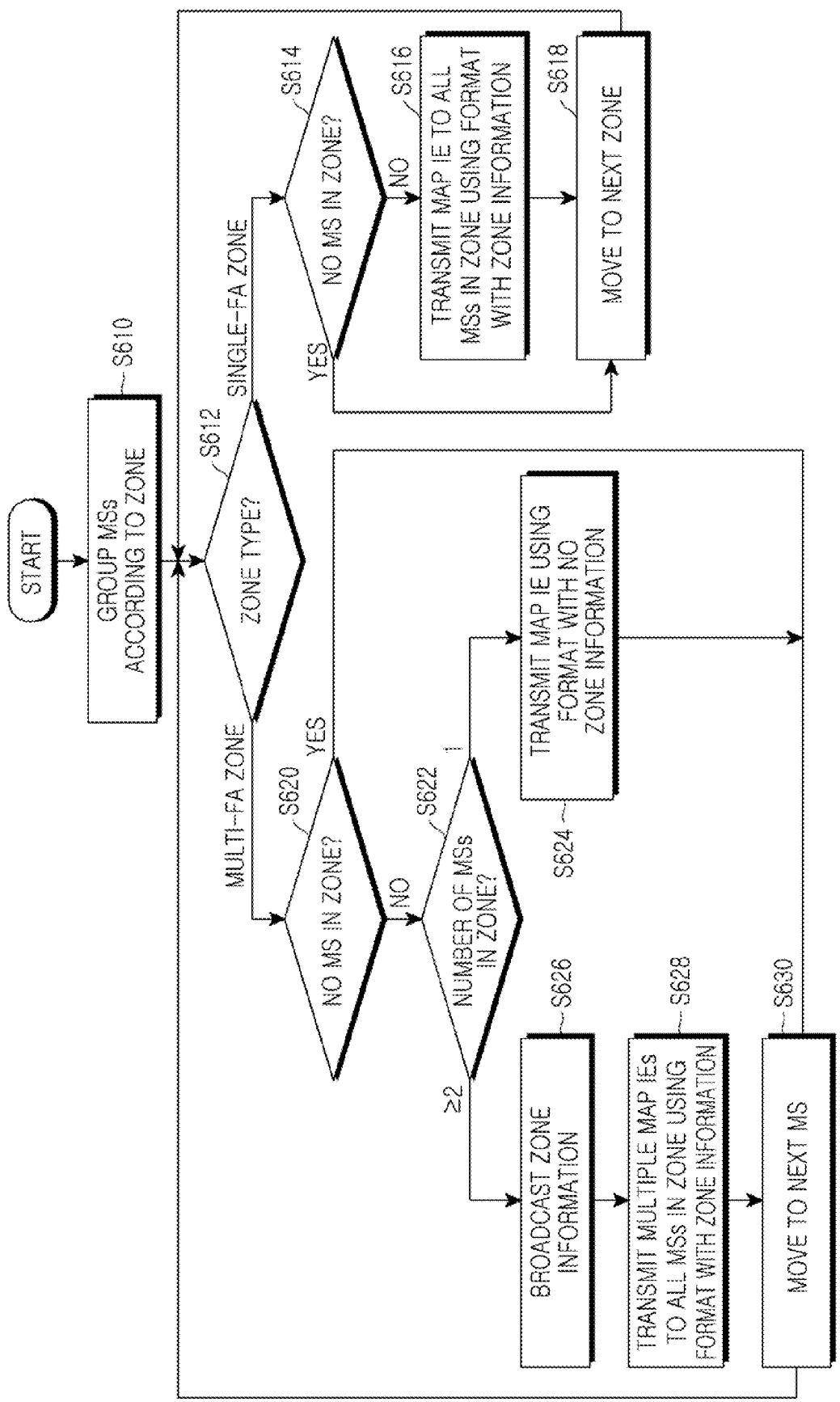
FIG. 6 is a flowchart illustrating a zone-based FO resource allocation method in a BS according to another exemplary embodiment of the present invention.

FIG. 6 is a flowchart illustrating a zone-based FO resource allocation method in a BS according to another exemplary embodiment of the present invention.

Referring to FIG. 6, a BS groups MSs using the same FA set into zones in step S610, and determines in step S612 whether a type of each grouped zone is a multi-FA zone or a single-FA zone. If the zone type is a single-FA zone, the BS determines in step S614 whether there is any MS in the corresponding zone. Similarly, if the zone type is a multi-FA zone, the BS determines in step S620 whether there is any MS in the corresponding zone. If it is determined in step S614 that there is no MS in the corresponding zone, the BS returns to step S612 after determining to decide the next zone in step S618. However, if it is determined that there is any MS in the corresponding zone in step S614, the BS transmits MAP IE with no zone information to all MSs in the corresponding zone in step S616.

Similarly, if there is no MS in the corresponding zone in step S620, the BS moves to the next zone in step S630. However, if there is any MS in the corresponding zone, the BS determines the number of MSs in the zone in step S622. If it is determined in step S622 that the number of MSs is one, the BS transmits a MAP IE with no zone information to the MS in the zone in step S624. However, if the number of MSs is greater than or equal to 2, the BS broadcasts zone information to the MSs in the zone in step S626. The zone information indicates a starting point of the allocable frequency resource. The BS transmits MAP IEs including a resource indicator to all MSs in the zone in step S628. The BS returns to step S612 after determining to transmit MAP information of the next zone in step S630.

Figure 7:
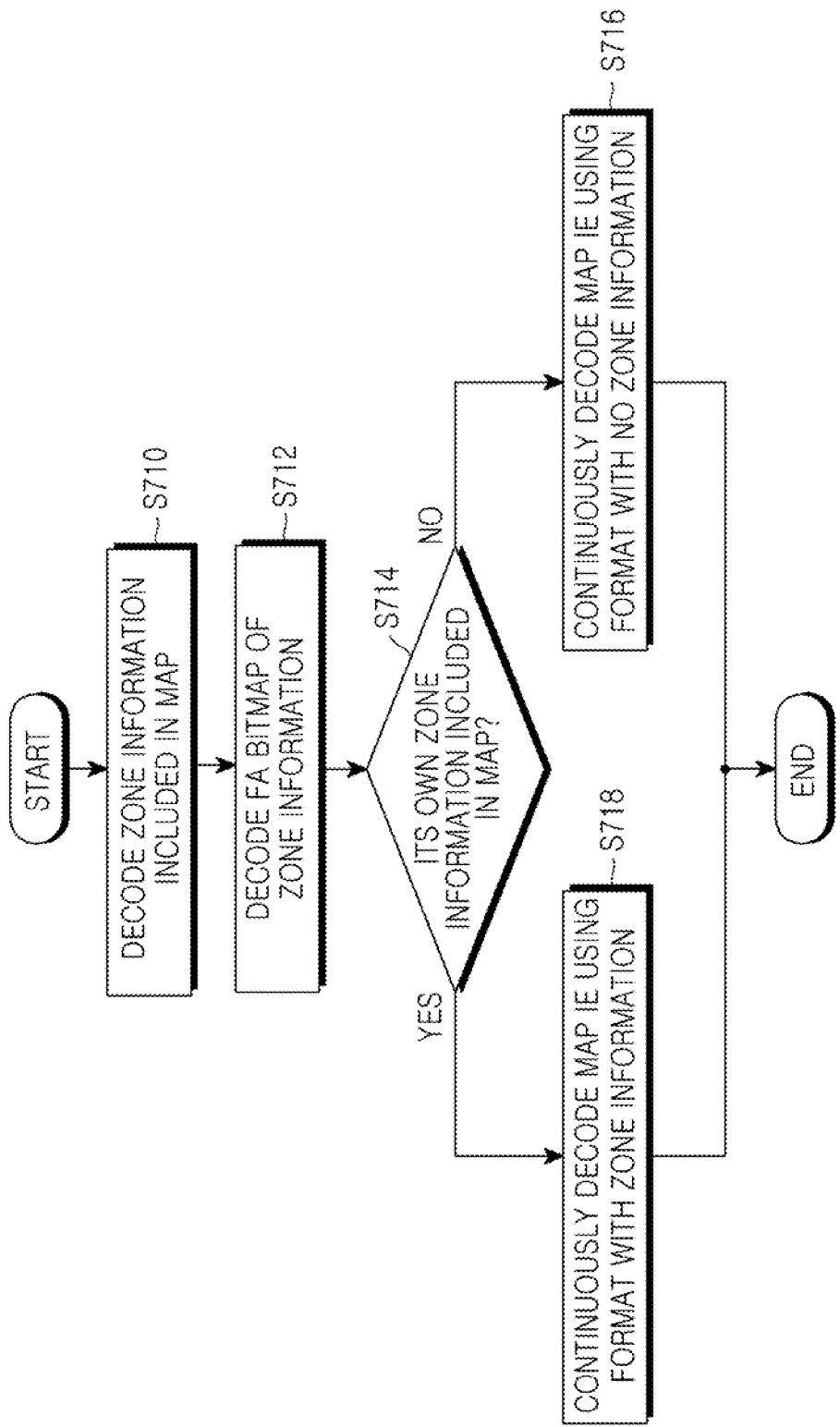
FIG. 7 is a flowchart illustrating a zone-based FO resource allocation method in an MS according to an exemplary embodiment of the present invention.

FIG. 7 is a flowchart illustrating a zone-based FO resource allocation method in an MS according to an exemplary embodiment of the present invention.

Referring to FIG. 7, upon receipt of MAP from a BS, an MS decodes zone information included in the received MAP in step S710. After the zone information is decoded, the MS decodes an allocated MAP IE, and checks an 'FA usage bitmap' field in the zone information to determine a zone to which the MS belongs, in step S712. If it is determined in step S714 that the MS's zone information is not included in the MAP, the MS continuously decodes the MAP IE using MAP IE's format including no zone information in step S716. However, if it is determined that zone information of the MS is included in the MAP, the MS continuously decodes the MAP IE using the format including zone information in step S718.

In order to reduce MAP overhead that linearly increases due to the use of multiple FAs in a separate coding MAP message, when all frequency resources are used, IEs of the MAP message only need a maximum of 48 bits to indicate resource allocation. Therefore, the MAP overhead does not linearly increase according to the number of FAs, and the minimum size of the resource block is maintained in each MS. This technique is advantageous in that each zone has a small number of resource slots, and the number of bits needed to indicate each slot is also small. In addition, when a zone is divided due to the use of FAs, each zone needs only a resource indication field to indicate a frequency resource allocated to a specific MS, regardless of the number of FAs used. The resource indication field indicates a node ID of the tree-based technique and/or a starting point and a length of the start-length technique.

As is apparent from the foregoing description, exemplary embodiments of the present invention group a plurality of MSs according to their zone and transmit zone information and frequency resource allocation information, thereby reducing overhead and ensuring efficient use of frequency resources.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating frequency resources by a Base Station (BS) in a frequency overlay system, the method comprising:

grouping a plurality of Mobile Stations (MSs) based on zones, each zone including a plurality of MSs capable of using a same frequency set;

multicasting zone information indicating a frequency resource available for each zone to MSs which belong to a related zone;

unicasting resource allocation information indicating an allocated frequency resource to at least one MS to which the frequency resource is allocated, among the MSs which belong to the related zone; and communicating with the at least one MS using the allocated frequency resource indicated by the resource allocation information, within the frequency resource indicated by the zone information, wherein at least one Frequency Allocation (FA) of a frequency set related to one zone overlaps with at least one FA of a frequency set related to another zone.

2. The method of claim 1, wherein the zone information indicates a starting point of resource slots in each FA included in a frequency set available by the MSs which belong to the related zone.

3. The method of claim 1, wherein the resource allocation information includes at least one of a Downlink Interval Usage Code (DIUC) indicating a number of slots each MS will receive and a location of a related slot, information related to a Repetition Coding, information related to a Power Boosting, an Identifier (ID) of a zone, a Node ID indicating a length of a frequency resource related to the zone, and information related to a Cyclic Redundancy Check (CRC).

4. The method of claim 1, wherein the resource allocation information includes at least one of a Downlink Interval Usage Code (DIUC) indicating a number of slots each MS will receive and a location of a related slot, information related to a Repetition Coding, information related to a Power Boosting, an Identifier (ID) of a zone, a Start Offset indicating a starting point of frequency resource related to the zone, and a Length indicating a length of the frequency resource related to the zone.

5. The method of claim 1, wherein the resource allocation information includes at least one of a start offset and a length for the allocated frequency resource.

6. The method of claim 1, wherein resource slots in the frequency resource available for each zone are indexed in a round-robin order.

7. An apparatus for allocating frequency resources in a Base Station (BS) for a frequency overlay system, the apparatus comprising:

a device for grouping a plurality of Mobile Stations (MSs) based on zones, each zone including a plurality of MSs capable of using a same frequency set, multicasting zone information indicating a frequency resource available for each zone to MSs which belong to a related zone, unicasting resource allocation information indicating an allocated frequency resource to at least one MS to which the frequency resource is allocated, among the MSs which belong to the related zone, and communicating with the at least one MS using the allocated frequency resource indicated by the resource allocation information, within the frequency resource indicated by the zone information, wherein at least one FA of a frequency set related to one zone overlaps with at least one FA of a frequency set related to another zone.

8. The apparatus of claim 7, wherein the zone information includes information indicating a starting point of resource slots in each FA included in a frequency set available by the MSs which belong to the related zone.

9. The apparatus of claim 7, wherein the zone information includes an FA usage bitmap indicating a slot offset of a zone in FAs available by the MSs which belong to the related zone, a zone's slot offset indicating a starting point of each of the FAs, and a total number of slots in all FAs in a specific zone.

10. The apparatus of claim 7, wherein the resource allocation information includes at least one of a Downlink Interval Usage Code (DIUC) indicating a number of slots each MS will receive and a location of a related slot, information related to a Repetition Coding, information related to a Power Boosting, an Identifier (ID) of a zone, a Node ID indicating a length of frequency resource related to the zone, and information related to a Cyclic Redundancy Check (CRC).

11. The apparatus of claim 7, wherein the resource allocation information includes at least one of a Downlink Interval Usage Code (DIUC) indicating a number of slots each MS will receive and a location of a related slot, information related to a Repetition Coding, information related to a Power Boosting, an Identifier (ID) of a zone, a Start Offset indicating a starting point of frequency resource related to the zone, and a Length indicating a length of frequency resource related to the zone.

12. The apparatus of claim 7, wherein the resource allocation information includes at least one of a start offset and a length for the allocated frequency resource.

13. The apparatus of claim 7, wherein resource slots in the frequency resource available for each zone are indexed in a round-robin order.

14. A method for receiving allocated frequency resources by a Mobile Station (MS) in a frequency overlay system, the method comprising:

receiving zone information indicating a frequency resource available for each zone from a Base Station (BS);

receiving resource allocation information indicating an allocated frequency resource, which is unicast to at least one MS to which the frequency resource is allocated, among a plurality of MSs which are grouped based on zones; and communicating with the BS using the allocated frequency resource indicated by the resource allocation information, within the frequency resource indicated by the zone information, wherein the BS groups the plurality of MSs based on the zones, each zone including a plurality of MSs capable of using a same frequency set, and wherein at least one Frequency Allocation (FA) of a frequency set related to one zone overlaps with at least one FA of a frequency set related to another zone.

15. The method of claim 14, wherein the zone information indicates a starting point of resource slots in each FA included in a frequency set available by the MSs which belong to the related zone.

16. The method of claim 14, wherein the resource allocation information includes at least one of a Downlink Interval Usage Code (DIUC) indicating a number of slots each MS will receive and a location of a related slot, information related to a Repetition Coding, information related to a Power Boosting, an Identifier (ID) of a zone, a Node ID indicating a length of frequency resource related to the zone, and information related to a Cyclic Redundancy Check (CRC).

17. The method of claim 14, wherein the resource allocation information includes at least one of a Downlink Interval Usage Code (DIUC) indicating a number of slots each MS will receive and a location of a related slot, information related to a Repetition Coding, information related to a Power Boosting, an Identifier (ID) of a zone, a Start Offset indicating a starting point of frequency resource related to the zone, and a Length indicating a length of frequency resource related to the zone.

18. The method of claim 14, wherein the resource allocation information includes at least one of a start offset and a length for the allocated frequency resource.

19. The method of claim 14, wherein resource slots in the frequency resource available for each zone are indexed in a round-robin order.

20. A method for allocating frequency resources by a Base Station (BS) in a frequency overlay system, the method comprising:
   grouping a plurality of Mobile Stations (MSs) based on zones, each zone including at least one MS capable of using a same frequency set;
   transmitting zone information indicating a frequency resource available for each zone only to MSs belonging to a related zone;
   unicasting resource allocation information indicating an allocated frequency resource to at least one MS to which the frequency resource is allocated, among the MSs which belong to the related zone; and
   communicating with the at least one MS using the allocated frequency resource indicated by the resource allocation information, within the frequency resource indicated by the zone information,
   wherein at least one Frequency Allocation (FA) of a frequency set related to one zone overlaps with at least one FA of a frequency set related to another zone.

21. A method for allocating frequency resources by a Base Station (BS) in a frequency overlay system, the method comprising:
   determining whether at least two Mobile Stations (MSs) of a plurality of MSs are capable of using an identical set of at least one Frequency Allocation (FA);
   grouping the at least two Mobile Stations (MSs) that are determined to be capable of using the identical set of at least one FA into a zone;
   multicasting zone information indicating a frequency resource available to the zone to the at least two MSs belonging to the zone;
   unicasting resource allocation information indicating an allocated frequency resource to at least one MS to which the frequency resource is allocated, among the MSs which belong to the related zone; and
   communicating with the at least one MS using the allocated frequency resource indicated by the resource allocation information, within the frequency resource indicated by the zone information,
   wherein a set of at least one FA related to one zone overlaps with a set of at least one FA related to another zone.

* * * * *